FIG. 1.

July 10, 1928.  
J. H. TAUSSIG  
1,677,102  
AUTOMATIC CONTROL FOR WATER GAS SETS  
Filed Sept. 19, 1924　7 Sheets-Sheet 2

FIG. 2.

WITNESS:  
Rob R Kitchel

INVENTOR  
John Hawley Taussig  
BY  
Augustus B. Stoughton  
ATTORNEY

Fig. 4.

July 10, 1928.　　　　　　　　　　　　　　　　　　1,677,102
J. H. TAUSSIG
AUTOMATIC CONTROL FOR WATER GAS SETS
Filed Sept. 19, 1924　　　　7 Sheets-Sheet 5

INVENTOR
John Hawley Taussig
BY
Augustus B. Stoughton
ATTORNEY.

July 10, 1928.

J. H. TAUSSIG

1,677,102

AUTOMATIC CONTROL FOR WATER GAS SETS

Filed Sept. 19, 1924

WITNESS:

INVENTOR

John Hawley Taussig
BY
Augustus B. Stoughton.
ATTORNEY.

FIG. 8.

Patented July 10, 1928.

1,677,102

UNITED STATES PATENT OFFICE.

JOHN HAWLEY TAUSSIG, OF PHILADELPHIA, PENNSYLVANIA, ASSIGNOR TO THE U. G. I. CONTRACTING COMPANY, OF PHILADELPHIA, PENNSYLVANIA, A CORPORATION OF DELAWARE.

AUTOMATIC CONTROL FOR WATER-GAS SETS.

Application filed September 19, 1924. Serial No. 738,570.

Objects of the present invention are to provide automatic control for water gas sets which will be reliable, efficient and dependable, to provide for placing the water gas apparatus in safety position should the power device actuating the control fail, to provide for placing the water gas apparatus in safety position from a distant point, to synchronize the selection mechanism and the actuating mechanism; to insure that the selective mechanism shall act pre-selectively in respect to the actuating mechanism; and to provide for conveniently changing the operation of the selective mechanism in order to effect for example split runs and to permit some of the valves to remain closed or subjected to automatic control.

Other objects of the invention will appear from the following description at the end of which the invention will be claimed but the invention will be first described in connection with the embodiment of it chosen from among other embodiments for the sake of illustration in the accompanying drawings forming part hereof and in which

Figure 1:
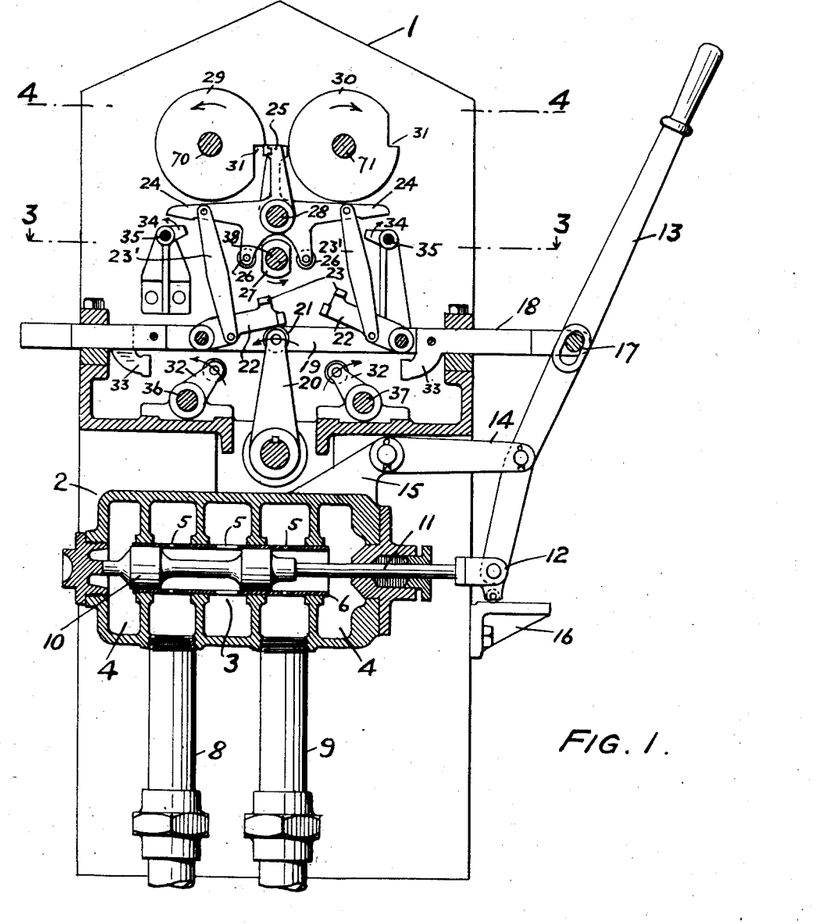
Figure 1 is an elevational view, partly in section, taken on the line 1—1 of Fig. 3.
Figure 2:
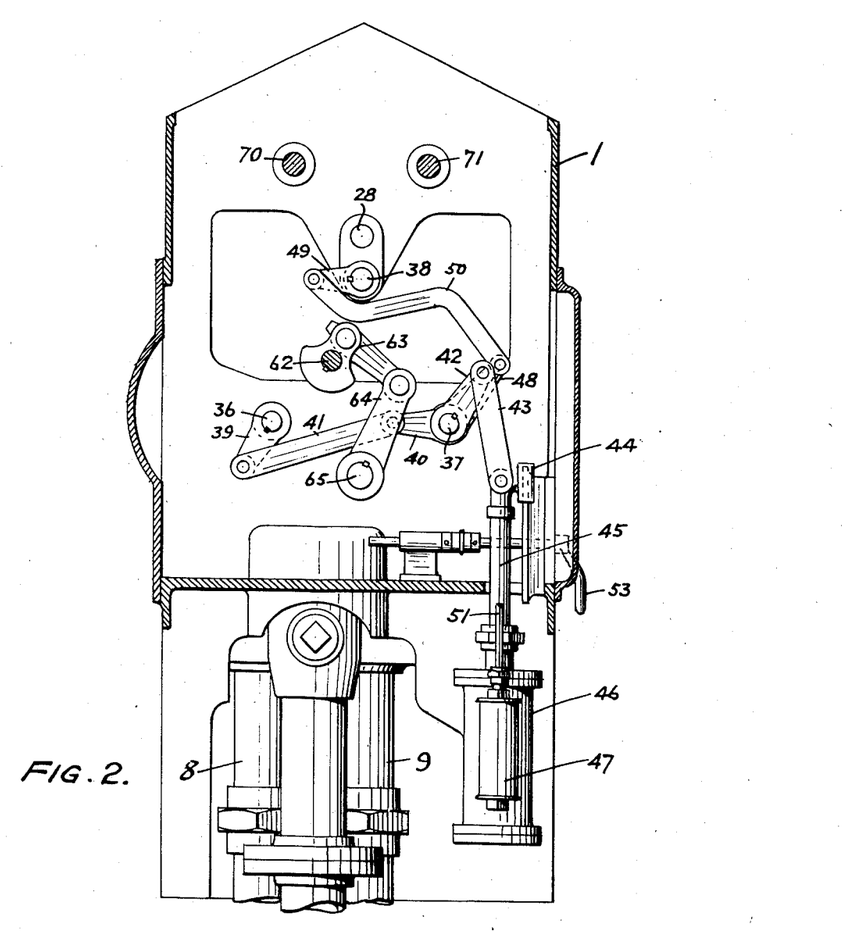
Fig. 2 is a similar view taken on the line 2—2 of Fig. 3.

As shown the device or control is contained within a generally rectangular housing 1 fitted with appropriate doors and adapted to sustain bearings and supports for the moving and other parts of the control. Referring to Fig. 1, 2 is a master valve and it serves to bring about the opening and closing of one of the valves of the water gas set or apparatus. Those skilled in the art understand that the operation of a water gas set is controlled usually by six valves which will be designated for the sake of identification apparatus valves. In the present invention there is a master valve 2 for each of the apparatus valves that is to be automatically controlled and operated; consequently there is considerable duplication of parts in the automatic control and the apparatus shown includes six sets of mechanism co-operating therewith, but a description of one master valve and one set of such mechanism will be sufficient for an understanding of the others. Referring to the master valve 2, Fig. 1, 3 is the inlet and 4 are the outlets. The ports 5 in the sleeve 6 direct the actuating fluid to and from the pipes 8 and 9 according to the position of the piston valve 10 and in that way an apparatus valve is opened and closed and permitted to remain or dwell in either open or closed position. The spindle 11 of the piston valve 10 is connected by means of a shackle 12 with one end of a lever 13 operated manually or automatically. This operating lever 13 is pivotally connected to a link 14 which in turn is pivoted to a fixed bracket 15. The end of the operating lever 13 is fitted with a roller and is movable upon the bracket 16. The lever 13 has slot-and-pin connection 17 with a reciprocatable bar 18. The bar 18 is centrally slotted as at 19, Fig. 3, and in this slot there is arranged the free end of a rocking arm 20 shown as fitted with a roller 21. Confronting pawls 22 are shown as arranged in this slot 19, and they are pivoted to the bar 18 and are fitted with heads 23 that are wider than the slot 19 and engage the members of the bar at the sides thereof and in that way limit the turning of the free ends of the pawls in downward direction. Each pawl 22 is connected by a link 23′ with one arm 24 of a cam follower of which another arm 25 co-operates with the selection cam and of which another arm 26 co-operates with a throw-out cam 27. The cam followers are turnably mounted on a shaft 28. In the present instance the selection cam 29 brings about what is called a run or gas-making operation and the selection cam 30 brings about what is called a blow. The parts last described are timed and constructed in such a way that a low part 31 of the cam comes opposite the arm 25 of the follower while the pawl 22 is still riding on the roller 21, so that it is the throw of the arm 20 that brings about the actual engagement of the arm 20 and the pawl and in this way the action of the cam 29 is pre-selective in respect to the actuation of the bar 18. The function of the cam 27 is to act upon the rollers on the arms 26 and in that way turn and hold the followers, so that the arms 25 may not fall into the low parts 31 of the cams and thus the pawls 22 are held clear of the rocker arm 20, and the bar 18 is free for manual operation by means of the lever 13. The bar 18 may also be operated by the dogs 32 fitted at their ends with rollers which act upon arms 33 fast and depending from the bars. 34 are fingers adapted to be turned into contact with the arms 24 and they serve to prevent the followers from falling into the low parts 31 and in that way maintain the pawls 22 out of action. These fingers are a means particularly adapted for association with the mechanism of those of the master valves that appertain to certain of the apparatus valves which it may at times be desirable to disassociate or free from automatic control. In general the dogs 32 are a means for bringing all of the apparatus valves to shut down position either manually or in the event of failure of the electrical power that is used for actuating the control as will be hereinafter described. The shafts 35 upon which are attached the fingers 34 extend through the housing 1 and are accessible for turning in order to turn the fingers. The shafts 36, 37 and 38 which carry the dogs 32 and the throw-out cam 27 extend along the apparatus and are common to the described sets of mechanism that appertain to the various master valves and they are a means for bringing the apparatus valves to shut-down position either upon failure of the electrical power or manually. As shown the shafts 36 and 37, Fig. 2, are provided with crank arms 39 and 40 connected by a link 41. The shaft 37 is provided with another crank arm 42 connected by a link 43 with the slidable crosshead 44 of the piston rod 45 of a fluid cylinder 46 controlled by a valve 47. The shaft 37 is also provided with another crank arm 48 which is connected with a crank arm 49 on the shaft 38 by a link 50, the peculiar form of which provides clearance. The spindle 51 of the valve 47 is operated to bring the apparatus valves to shut down position either manually by 51ª, (Fig. 4) or by means of the solenoid 52, Fig. 3, which is effective for that purpose upon failure of the electrical power supplied to the machine as will hereinafter appear. 53 is a hand operated latch for preventing the crosshead from travelling far enough to permit the dogs 32, acting on the arms 33, to lock the bars 18 in shutdown position, and this latch 53 is availed of to permit of hand operation of the levers 13.

Figure 3:
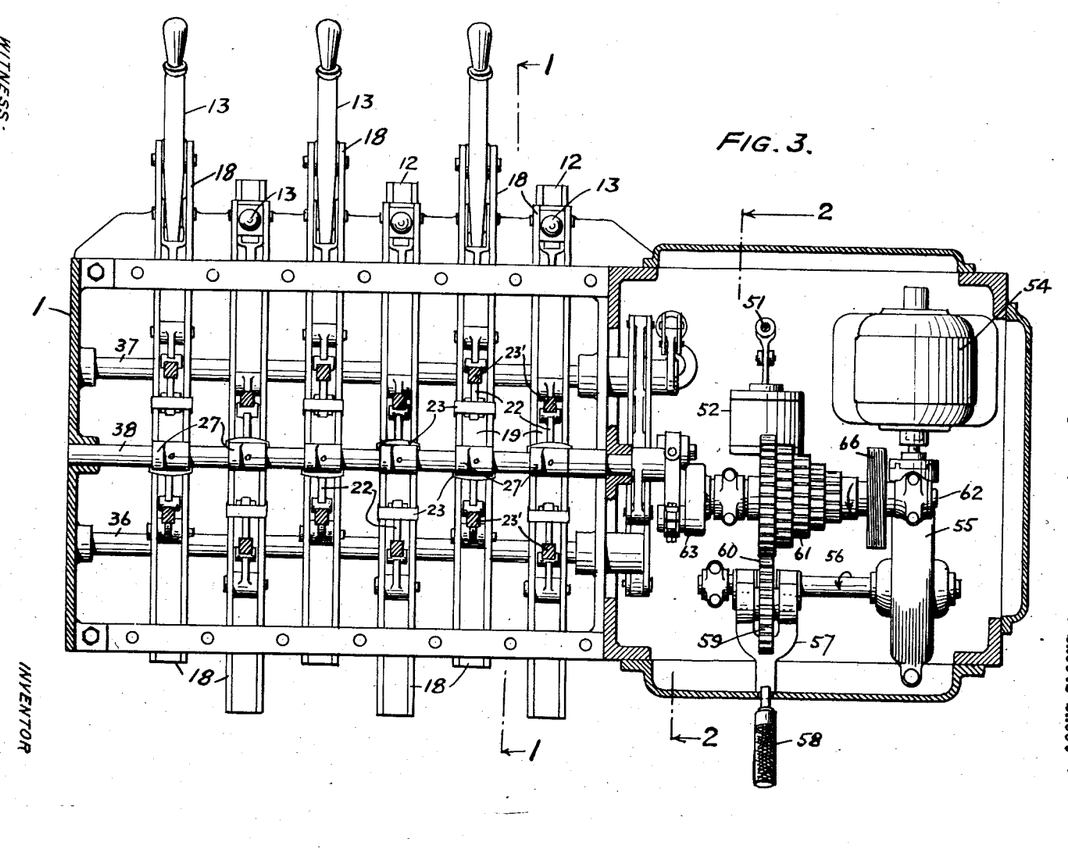
Fig. 3 is a horizontal sectional view taken on the line 3—3 of Figure 1.
Figure 4:
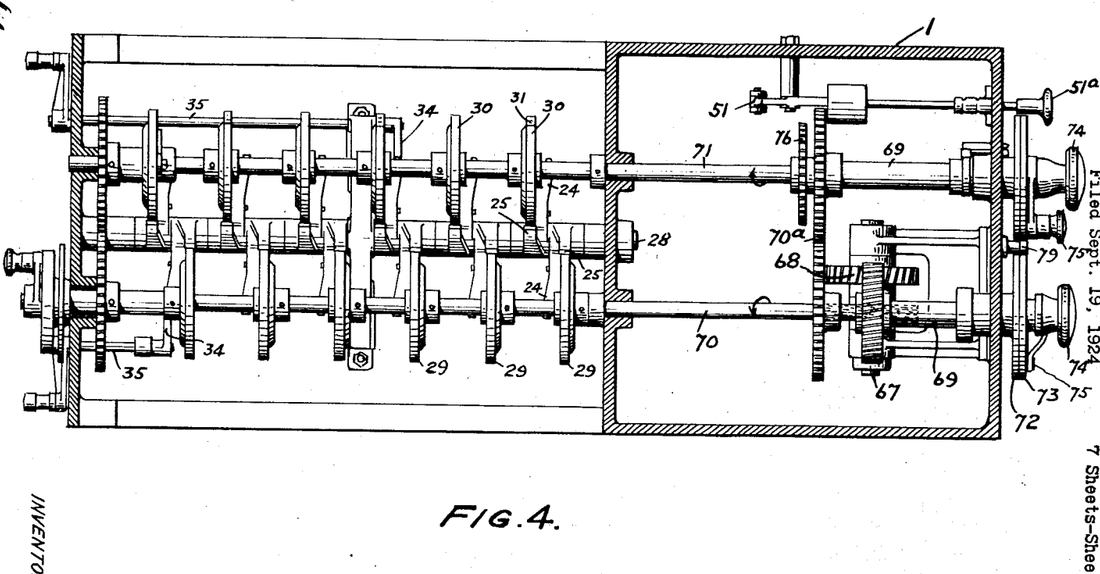
Fig. 4 is a horizontal sectional view taken on the line 4—4 of Figure 1.
Figure 5:
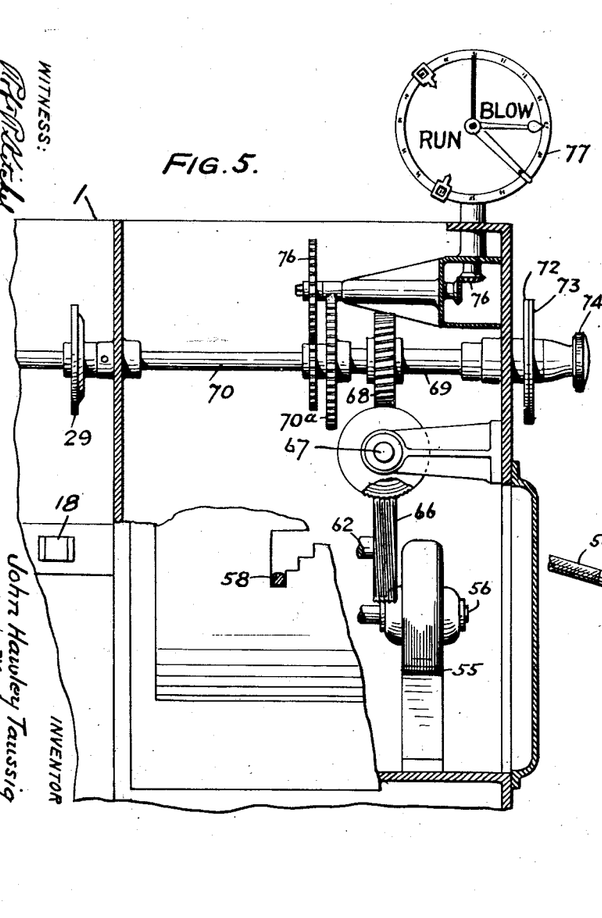
Fig. 5 is an elevational view, partly in section, of some of the parts shown at the right-hand ends of Figs. 3 and 4.
Figure 6:
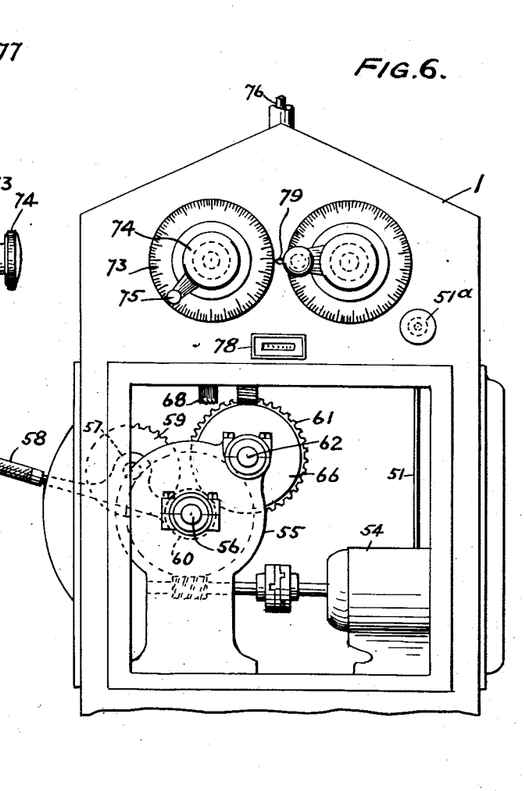
Fig. 6 is an elevational view of the end of the apparatus shown at the right in Fig. 4.

54 is a motor, Fig. 3, which through a worm gear enclosed in a casing 55 drives the shaft 56 of a gear changing device. The carriage 57 is provided with a handle 58 which is mounted both to afford a range of turning motion and of sliding motion in respect to the shaft 56. This carriage has turnably mounted in it a gear wheel 59 meshing with a gear wheel 60 slidable on and turned with the shaft 56 and the gear wheel 59 also meshes with any one of the cone set of gears 61. The shaft 62 is, by the gear shift mechanism described, driven at an appropriate speed. Upon this shaft 62 is a crank arm 63, Fig. 2, which makes complete revolutions and which is connected with a crank arm 64 on the rock-shaft 65 that extends clear across the machine and carries the rocker arms 20. The shaft 62 by worm 66, Fig. 5, drives a counter-shaft 67 which by worm gearing 68 drives a sleeve 69 on one of the cam shafts 70, and there is a similar sleeve on the other cam shaft 71. Each sleeve 69 is connected with a disk 72 and each cam shaft is connected with a disk 73 having a knob 74, and there is a pin 75 by means of which the disks can be connected to permit the sleeve to drive the shaft and by which the disks can be disconnected to permit of such manual rotation of the shaft as may be necessary or desirable for adjusting the angular relation of the cams. The gearing 70ª is interposed between the sleeve on shaft 71, and the shaft 70, and serves to actuate the shafts at the same speed after they have been angularly set. From this description it follows that the cam shafts and the rocker shaft 65 are connected and actuated through the same drive gear and therefore are synchronized. The shaft 71 is connected by gearing 76 with an indicator 77 which serves to keep the attendant advised concerning the operation of the control.

78 is a counter and 79 is a marker.

The control is set to bring about the required operations of the apparatus valves for the purpose of a predetermined gas making operation. For this purpose the angular relation of the cam shafts is adjusted, the finger 34 appertaining to certain of the apparatus valves is set to throw-out position divorcing the valve from the automatic control, the gear shift 58 is adjusted for the required speed per unit of time, and the indicator may be noted. Then upon supply of current to the motor 54, the automatic control is driven and continues to operate in the manner described. The automatic control may operate at any time to bring all of the apparatus valves to shut-down position either by the manual manipulation of the rod 51ª which controls the rod 51, or automatically upon failure of current by the solenoid 52, in circuit with the motor, acting on the rod 51. At any time after the automatic control has brought the apparatus valves to shut-down position, they may not be operated manually by the levers 13, or automatically because the bars 18 are locked by the parts 32 and 33. In order to again start the apparatus it is necessary to effect an upstroke of the fluid motor 46, and this can be done only by moving the valve 47 by means of the knob 51ª.

Figure 7:
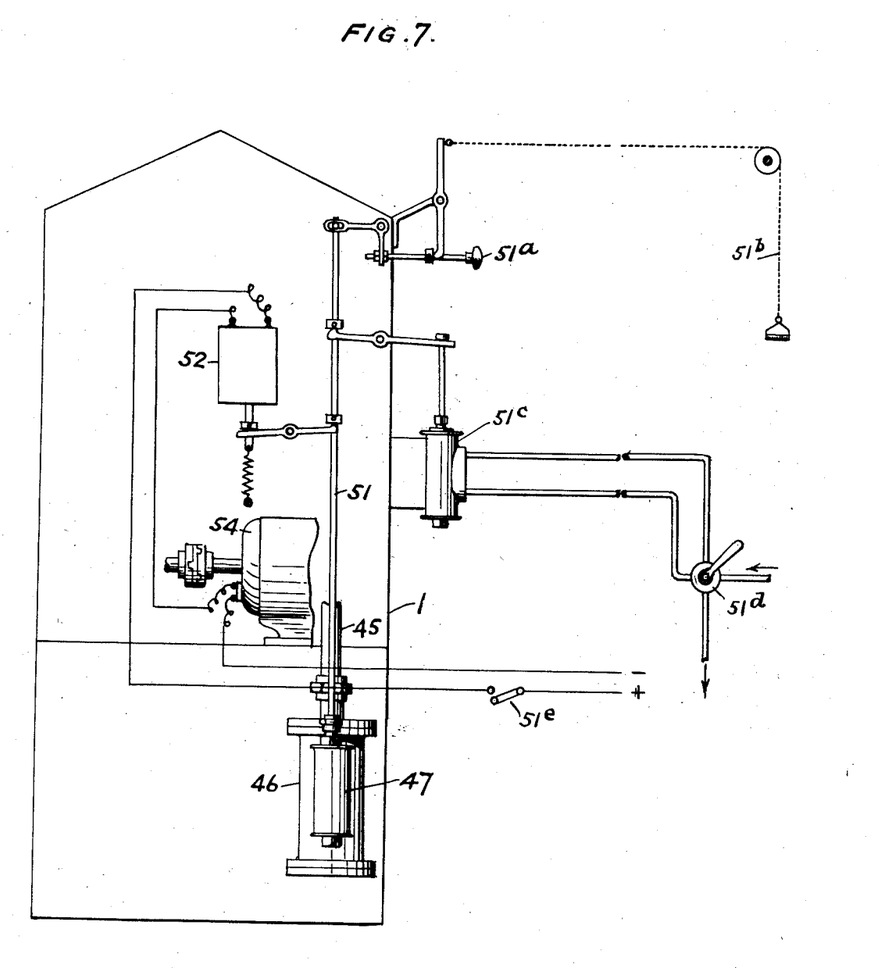
Fig. 7 is an elevational view illustrating provisions for causing the power device to place the automatic control in position to shut down the apparatus valves from a distant point.

In addition to the operation of the power device 46 for placing the automatic control in position to shut down the apparatus valves by means of the hand lever or knob 51ª and its connections, or by means of the solenoid 52 and its connections, this may be accomplished from a distance by means of the pull cord 51ᵇ (Fig. 7) or by means of an auxiliary cylinder or piston 51ᶜ connected with the rod 51 by means of a suitable lever (Fig. 7) and controlled by means of a starting and stopping valve 51ᵈ, which may be located at any convenient or distant point, or by means of a switch 51ᵉ arranged in the motor circuit, (Fig. 7).

Figure 8:
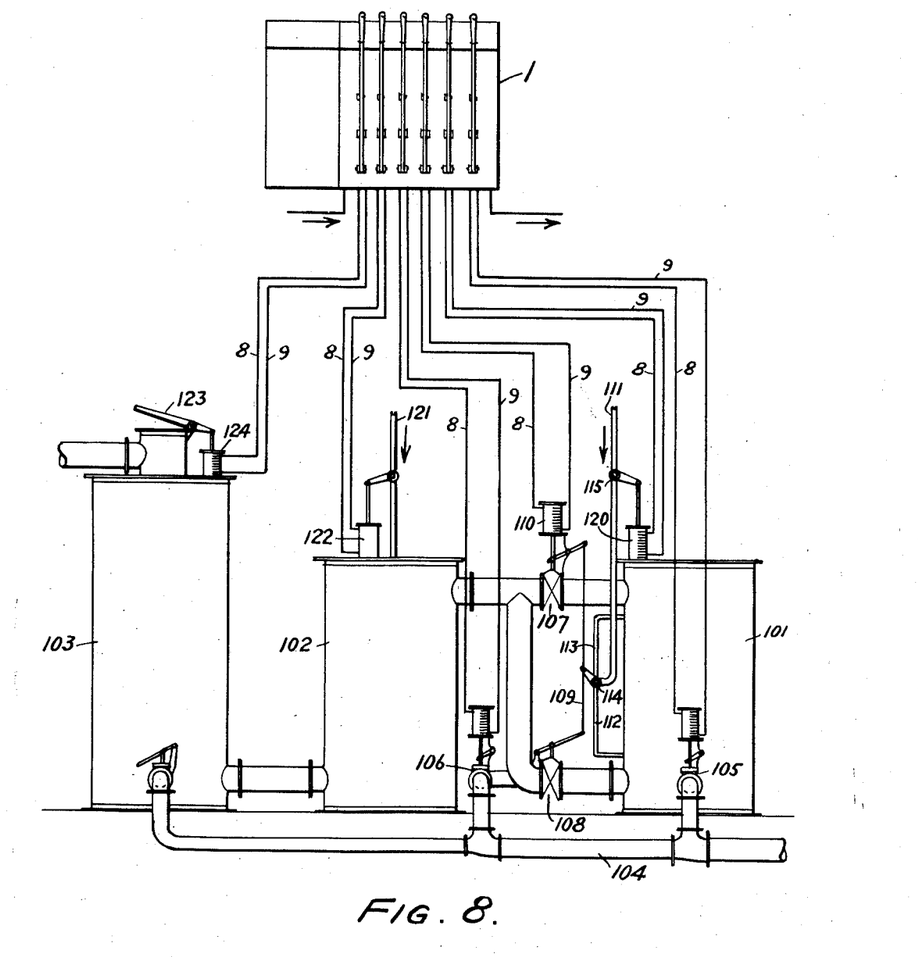
Fig. 8 is a diagrammatic and schematic view illustrative of a water gas set having in application thereto the automatic control illustrated in the other figures of the drawing.

101 is the generator, 102 the carbureter, and 103 the fixing chamber which are the essential vessels of a water gas set or apparatus. 104 is the air line communicating with the interiors of the vessels by branches having valves 105 and 106 operated by appropriate cylinders. 107 and 108 are reversing valves inserted in the connections between the carbureter and generator, connected by linkage 109 operated by piston and cylinder 110. 111 is a steam connection having branches 112 and 113 to the top and bottom of the generator and controlled by a reversing valve 114 connected with the linkage 109. 115 is the steam valve and it is operated by a piston and cylinder 120. 121 is an oil pipe having a valve operated pipe piston and cylinder 122. 123 is a stack valve operated by piston and cylinder 124. The apparatus described in this paragraph is well understood by those skilled in the art and the order in which the various valves are operated in the gas making cycle is too well understood to require detail description. From each of the master vlaves 2, which are contained in the housing 1 along with other elements of what is known as an automatic control, lead connections 8 and 9 to each of the cylinders and pistons of the apparatus valves to which reference has been made.

It will be obvious to those skilled in the art to which the invention relates that modifications may be made in details of construction and arrangement without departing from the spirit of the invention which is not limited as to those matters or otherwise than as the prior art and the appended claims may require.

I claim:

1. Automatic control for water gas sets including rocker arms, reciprocatable bars, master valves operatably connected with the bars, pivotal cam followers, confronting pivotal pawls carried by the bars and connected with the followers, throw-out cams for the followers, pivotal dogs for positioning the bars, and means common to the throw-out cams and dogs and adapted to position the bars.

2. Automatic control for water gas sets including rocker arms, reciprocatable bars, master valves operatably connected with the bars, pivotal cam followers, confronting pivotal pawls carried by the bars and connected with the followers, throw-out cams for the followers, pivotal dogs for positioning the bars, means common to the throw-out cams and dogs and adapted to position the bars, and manually operatable turnable fingers for setting certain of the followers in inoperative position to free the corresponding bar from automatic control.

3. Automatic control for water gas sets including rocker arms, reciprocatable bars, master valves operatably connected with the bars, pivotal cam followers, confronting pivotal pawls carried by the bars and connected with the followers, throw-out cams for the followers, pivotal dogs for positioning the bars, power means common to the throw-out cams and dogs and adapted to position the bars, and manual and electrical devices for operating said power means.

4. Automatic control for water gas sets including reciprocatable bars, rocker arms, pawls on the bars adapted to engage and disengage the rocker arms, manual means for shifting the bars, cams and cam followers for the pawls, and throw-out cams arranged between the cam followers and each adapted for putting two cam followers in position with the pawls out of action to permit of manual operation of the bars.

5. In automatic control for water gas sets a master valve, a lever for operating the same, a pivotal link to which the lever is pivoted, a bracket upon which the end of the lever is movable, a bar having pin and slot connection with the lever, and disconnectable means for reciprocating the bar and for freeing the bar for manual operation by the lever.

6. In automatic control for the valves of water gas sets a rocker arm, a bar slotted for the accommodation of the rocker arm, pawls pivoted in the slot and having heads for engagement with the top of the bar, and cam mechanism for positioning the pawls.

7. In automatic control for the valves of water gas sets the combination of a rocker arm, a reciprocatable bar, a pawl pivoted to the bar and adapted to ride on the end of the rocker arm and to be engaged by the rocker arm, a cam follower connected with the pawl, and a cam constructed to release the follower whilst the pawl is riding on the end of the arm.

JOHN HAWLEY TAUSSIG.